Sept. 13, 1966     W. D. MULLINS, JR     3,272,016

THREE-AXIS ACCELEROMETER

Filed Oct. 3, 1961     2 Sheets-Sheet 1

INVENTOR.
WILLIAM D. MULLINS, JR.

BY *Edward A. Sokolski*

ATTORNEY

Sept. 13, 1966     W. D. MULLINS, JR     3,272,016

THREE-AXIS ACCELEROMETER

Filed Oct. 3, 1961     2 Sheets-Sheet 2

INVENTOR.
WILLIAM D. MULLINS, JR.

BY *Edward A. Sokolski*

ATTORNEY

3,272,016
THREE-AXIS ACCELEROMETER
William D. Mullins, Jr., Downey, Calif., assignor to North American Aviation, Inc.
Filed Oct. 3, 1961, Ser. No. 142,641
2 Claims. (Cl. 73—517)

This invention relates to a three-axis accelerometer and more particularly to such an accelerometer in which magnetic support of the proof mass is attainted by maintaining the proof mass and the associated support coils super conductive.

It is well known in the art that if an electrically conductive material can be maintained in a cryogenic environment that super conductivity can be attained in the conducting material. With such super conductivity, serious deleterious heating effects of the current are avoided and precisely equivalent image currents can be induced in an adjacent superconducting surface. Magnetic support of an inertial element, such as the proof mass in an accelerometer, has been proposed by the prior art as a highly efficient means of support with minimum friction between the supported element and the case. With this type of support, the proof mass can be fully levitated in a vacuum with no coercive mechanical constraint to the case. In the absence of a superconductive proof mass, to generate a high enough magnetic field between the case and the support elements, however, to adequately support even a small proof mass results in deleterious heating of the instrument and requires the addition of magnetic windings to the proof mass with electrical leads fed thereto.

The device of this invention overcomes these shortcomings by maintaining an electrically conductive proof mass as well as the support coil utilized in conjunction therewith at a cryogenic temperature at which these conductive elements are superconducting. A proof mass having three pairs of oppositely oriented broad surfaces is utilized. Each of these broad surfaces is positioned opposite and in close proximity to a separate support coil which is fixedly attached to the accelerometer case. Each surface pair is located in a plane normal to a separate axis, the three axes involved being mutually orthogonal. Oppositely positioned support coils are connected in series with each other and excited by a D.-C. current source. A flow of current in the coils will generate precisely equivalent image currents in the superconducting oppositely positioned surfaces. These image currents co-acting with the current flow in the coils result in magnetic forces strong enough to support the proof mass along each of the mutually orthogonal axes normal to the pairs of proof mass surfaces.

A pair of pickoff plates is utilized for each of the axes to sense displacement of the proof mass from a predetermined central or null position. The outputs of these pickoff plates are fed to control means which are used for maintaining the proof mass in a balanced magnetically supported position. When the proof mass experiences accelerations along any of the three axes, control currents will be generated and fed to the support coils in accordance with this acceleration to maintain the proof mass in a balanced position. These control currents can be used as an output signal indicative of the sensed acceleration.

It is therefore an object of this invention to provide an improved three-axis accelerometer.

It is a further object of this invention to provide an accelerometer in which the proof mass is magnetically supported.

It is still a further object of this invention to increase the accuracy of a three-axis accelerometer by maintaining the proof mass and associated circuitry in a cryogenic environment.

It is still a further object of this invention to maintain a proof mass magnetically supported with complete rotational stability without the necessity for any mechanial connections to the supported element.

Other objects of this invention will become apparent from the following description taken in connection with the accompanying drawings in which FIG. 1 is a perspective view of a preferred embodiment of the device of the invention as mounted within its case;

Figure 7:
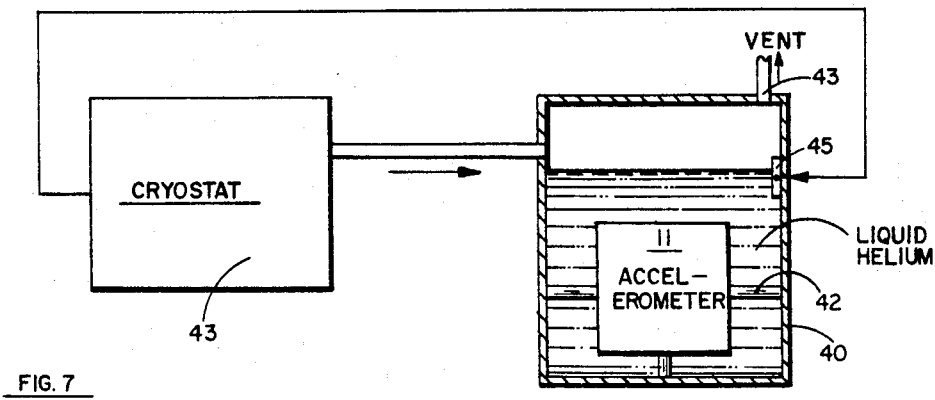

And, FIG. 7 is a diagram illustrating means for maintaining the device of the invention at the cryogenic temperature.

Figure 4:
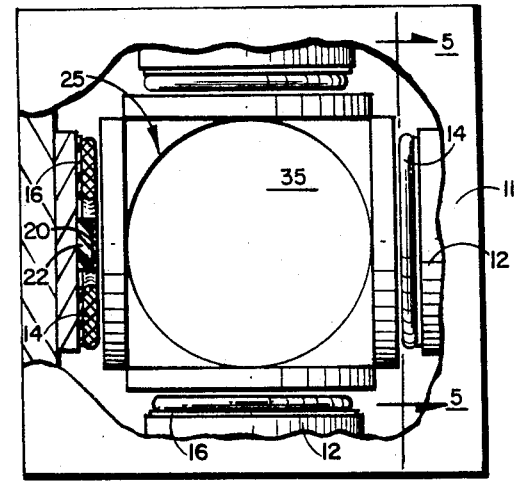
FIG. 4 is a cross-sectional view as taken along the plane indicated by the line 4—4 in FIG. 3.

Referring now to FIGS. 1–5, a preferred embodiment of the device of the invention is shown. The instrument is housed within a sealed case 11 which has been highly evacuated. A support bracket 12 is fixedly attached to each of the inner walls of case 11. A washer-shaped forcing or support coil 14 is fixedly attached to each of insulating members 16 which in turn are attached to an associated support bracket 12 by cementing or other suitable means. Capacitive pickoff plates 20 are fixedly attached to insulating pieces 22 which in turn are fixedly attached to the associated support brackets 12. Pairs of pickoff plates are provided for each of the three mutually orthogonal sensitive axes of the accelerometer with a separate plate being positioned in concentricity with each of forcing coils 14 as indicated in FIG. 4.

Figure 1:
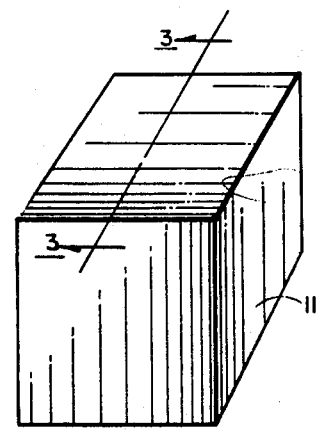
Figure 2:
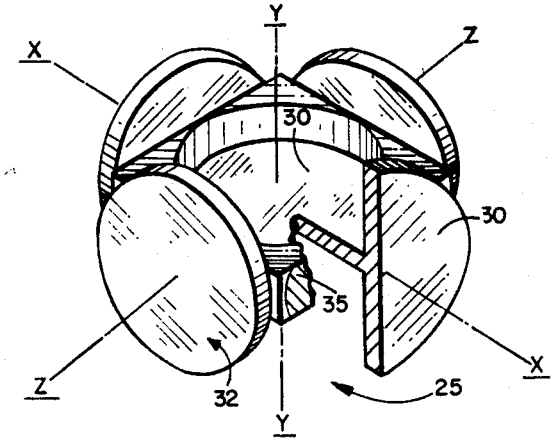
FIG. 2 is a perspective view with partial cutaway section of the proof mass utilized in the preferred embodiment of the device of the invention.

Referring now to FIG. 2, proof mass 25 has three pairs of oppositely oriented broad surfaces 30 lying in planes normal to mutually orthogonal axes. Proof mass 25 is constructed in such a way that it remains rigid while presenting a high surface area to mass ratio. This end result is achieved by constructing the proof mass with four disk-shaped sections 32 located at the extremities of the proof mass along the X and Z axes with a grooved out center structure 35 presenting a round surface area for the Y axis. Proof mass 25 should be fabricated of a low density homogenous material which will become super conducting at the cryogenic temperature and which has a high critical field at this temperature. Where liquid helium is utilized to obtain a cryogenic environment of 4° Kelvin, proof mass 25 may be fabricated of niobium or a low density dimensionally stable body coated with a niobium-tin alloy surface which can be obtained by plasma arc plating.

Figure 3:
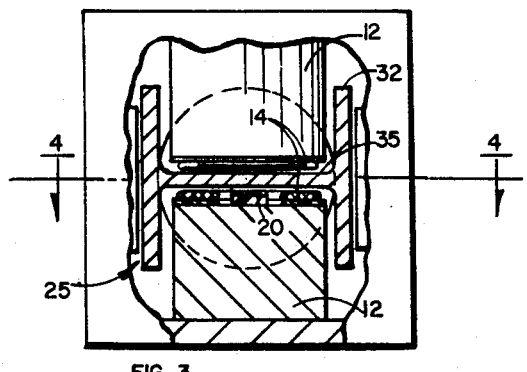
FIG. 3 is a cross-sectional view of the preferred embodiment of the device of the invention with partial cutaway section as taken along the plane indicated by the line 3—3 in FIG. 1.
Figure 5:
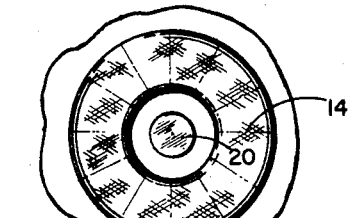
FIG. 5 is a cross-sectional view as taken along the plane indicated by the line 5—5 in FIG. 4.

As indicated in FIGS. 3 and 4, proof mass 25 is positioned in case 11 with forcing coils 14 and pickoff plates 20 in close proximity to and opposite an associated broad surface 30 of proof mass 25, with pairs of forcing coils 14 and pickoff plates 20 located along separate mutually orthogonal axes opposite the proof mass broad surfaces for these axes.

As indicated in FIG. 3, the support brackets 12 for the forcing coils and pickoff plates used for the Y axis must be considerably longer than those for the other axes to bring the forcing coils and pickoff plates into close proximity with the broad surfaces 30 formed as recessed sections of center structure 35. By constructing the proof mass in this fashion, the resultant mass is considerably reduced relative to the surface area presented, thereby facilitating the magnetic support of the proof mass.

The wire utilized for coils 14 and the material used for pickoff plates 20 should also be fabricated of niobium or a low density dimensionally stable body coated with a thin niobium-tin alloy surface. This is to minimize the dissipation of heat by these conducting elements with current flow therethrough which might adversely affect the cryogenic environment.

Referring now to FIG. 7, a device for maintaining the accelerometer at the cryogenic environment is illustrated. The accelerometer 11 is fixedly attached to the inside walls of case 40 by means of brackets 42. Liquid helium is generated by a cryostat 43. The accelerometer 11 is completely immersed in liquid helium within container 40. Venting is provided to the outside atmosphere for helium gas resulting from the boiling of the liquid helium by means of vent 43. The level of the liquid helium is maintained at the desired point by means of a level sensing switch 45 which sends a signal to cryostat 43 when the level falls below a predetermined point. This signal actuates the flow of additional liquid helium from the cryostat 43 into container 40 to restore the predesired level. A cryostat such as that commercially available from the Arthur D. Little Company may be utilized. Technique for maintaining accelerometer 11 at a cryogenic temperature is well known in the art and other available means for accomplishing this end result may be utilized, the device illustrated in FIG. 6 being shown only for exemplary purposes.

Figure 6:
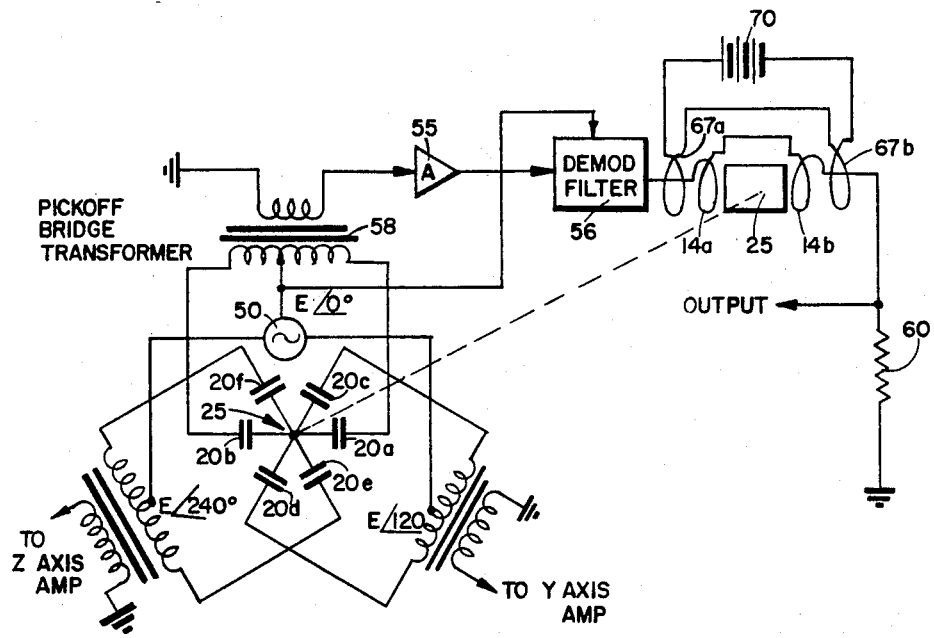
FIG. 6 is a schematic diagram illustrating the electrical circuitry used in the support and control functions for the preferred embodiment of the device of the invention.

Referring now to FIG. 6, electrical control circuitry for maintaining the proof mass at its balanced position and for reading out acceleration signals for each of the phase sensitive axes is illustrated. A three-phase power supply 50 providing an A.-C. signal at about 5 kc. is used as the reference signal generator. Each of the phase outputs of power supply 50 is connected to provide a signal in conjunction with a pair of pickoff plates 20 mounted along one of the three orthogonal axes. The circuits for each of the three orthogonal axes are identical to provide a balanced three-phase load under normal operating conditions whereby the sum of the currents to proof mass 25 is substantially zero.

The opeartion of the control circuits for each of the three axes is identical and for illustrative purposes the control circuit for the X axis is shown in detail in FIG. 6 and will now be described. The reference signal for the zero phase output of supply 50 is fed to the center tap of the primary winding of pickoff bridge transformer 58. Current will flow through the right-hand half of primary of transformer 58 to the right-hand pickoff plate 20a to proof mass 25 and through the left-hand portion of this winding to the paired opposite pickoff plate 20b to the proof mass. If proof mass 25 is equidistant from both plates 20a and 20b, the currents flowing through each of pickoff plates 20a and 20b to proof mass 25 by virtue of the capacitance therebetween will be equal in view of the equal capacitive reactance between both plates and the proof mass. Under such conditions equal and oppositely flowing currents through both halves of the primary of transformer 58 will produce no induced current in the secondary of this transformer.

Let us assume, however, that proof mass 25 is accelerated along the X axis so that it becomes slightly closer to pickoff plate 20a than to pickoff plate 20b. Under these conditions, a greater current flow will occur through the right-hand half of the primary of transformer 58 and to pickoff plate 20a than through the left-hand portion of the winding to pickoff plate 20b. This will result in an induced current in the secondary of the transformer having a predetermined phase relationship with the zero degree reference signal and an amplitude in accordance with the relative distance between proof mass 25 and pickoff plates 20a and 20b. This signal is amplified in amplifier 55 and demodulated in phase sensitive demodulator and filter 56 which utilizes E ∠0° as a reference to produce D.-C. output current having an amplitude and direction in accordance with the position of proof mass 25 relative to pickoff plates 20a and 20b. This output current is fed through oppositely positioned forcing coils 14a and 14b which are connected in series.

Forcing coils 14a and 14b which are positioned in close proximity to the super conducting broad surfaces 30 of proof mass 25 centered along the X axis will induce equivalent image currents in these super conducting surfaces. The image currents so generated will produce a magnetic field which when co-acting with the magnetic field produced by forcing coils 14a and 14b will result in a force therebetween which will tend to restore proof mass 25 to its original balanced position.

Proof mass 25 is supported as a linear function of the input currents by the addition of bias coils 67a and 67b which are connected in series with each other and receive power from D.-C. power source 70. These coils operate similarly to coils 14a and 14b in producing magnetic support fields. Coils 14a, 14b, and 67a and 67b may be wound together in bifilar windings. These coils as already noted should be wound with wire of a material similar to that used for proof mass 25. Winding 67a is wound so that it aids the field produced by winding 14a while winding 67b is wound so that it bucks winding 14b. With the coils wound in this fashion, a total support force which is a linear function of the input currents will be generated rather than one which is a function of the square of these currents. A separate set of bias coils (not shown) interconnected as shown for the X axis are used for each of the other support axes.

As already mentioned, a similar servo loop as described for the X axis is utilized for the Y and Z axes. With a balanced load for all three axes, the sum of the currents in proof mass 25 will be zero. Utilizing such a three-phase balanced system negates the necessity for having any wire connections to proof mass 25.

The device of this invention thus provides a highly precise three-axis accelerometer in which the proof mass is magnetically supported in a cryogenic environment. The mass of the proof mass is minimized and maximum conduction surface is provided therein for the generation of maximum support forces.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a three-axis accelerometer, a case, a proof mass having a pair of opposite broad surfaces made of material which becomes superconductive at a cryogenic temperature, normal to each of three mutually orthogonal axes, said proof mass also having two pairs of disk-shaped sections, each said section being positioned at an extremity of said proof mass opposite its paired section along one of said axes, two pairs of said broad surfaces being formed in said disk-shaped sections, said proof mass further having a recessed center structure, the third of said pairs of surfaces being formed in said center structure, three pairs of series connected support coils made of material which becomes superconductive at a cryogenic temperature, three pairs of pickoff plates, each of said support coils and said pickoff plates being attached to a separate wall of said case opposite one of said broad surfaces, each of said pairs of coils and said pairs of pickoff plates being positioned normal to a separate one of said axes, means for maintaining said case and its contents at a cryogenic temperature, means for developing a separate control current connected to each of said pairs of coils for maintaining said proof mass in a balanced position magnetically supported in said case, and A.-C. power source means connected to each of said pairs of pickoff plates, each said current developing means being operatively connected to an associated pair of said pickoff plates.

2. A three axis accelerometer comprising a proof mass having three pairs of oppositely oriented broad surfaces made of material which becomes superconductive at cryogenic temperatures, said surface pairs lying in planes normal to mutually orthogonal axes, said proof mass also having two pairs of disk-shaped sections, each said sections being positioned at an extremity of said proof mass opposite its paired section along one of said axes, two pairs of said broad surfaces being formed in said disk-shaped sections, said proof mass further having a recessed center structure, the third of said pairs of surfaces being formed in said center structure, a case, a separate pair of support coils made of materials which become superconductive at cryogenic temperatures, fixedly attached to said case at opposite sides thereof and positioned in close proximity to each of said broad surfaces, means for maintaining said case and its contents at a cryogenic temperature, a separate pair of oppositely oriented pickoff plates fixedly attached to said case and positioned in close proximity to each of said pairs of proof mass broad surfaces, a source of three phase power, each said pair of pickoff plates being connected to a separate phase output of said power source, and means operatively connected between each said pair of pickoff plates and each said associated pair of support coils for producing a control current to maintain said proof mass in a balanced magnetically supported position in accordance with the relative spacing between said pickoff plates and said proof mass, whereby the control current developed by each of said control means is indicative of acceleration to which said proof mass is subjected along a separate one of said mutually orthogonal axes.

References Cited by the Examiner

UNITED STATES PATENTS

| | | | |
|---|---|---|---|
| 2,919,583 | 1/1960 | Parker. | 73—504 |
| 3,026,151 | 3/1962 | Buchhold | 308—10 |
| 3,084,558 | 4/1963 | Wilcox et al. | 73—517 |
| 3,098,679 | 7/1963 | De Boice. | |
| 3,151,486 | 10/1964 | Plummer | 73—517 |

FOREIGN PATENTS 599,933  6/1960  Canada.

RICHARD C. QUEISSER, *Primary Examiner.*

S. LEVINE, JOSEPH P. STRIZAK, *Examiners.*

J. J. GILL, J. E. WEST, *Assistant Examiners.*